United States Patent [19]

Todd et al.

[11] 4,274,271
[45] Jun. 23, 1981

[54] HELMET LOCKING DEVICE

[76] Inventors: John Todd; Gregory M. K. West, both of 2 Campbellfield Ave., Campbelltown, N.S.W., 2560, Australia

[21] Appl. No.: 27,822

[22] Filed: Apr. 6, 1979

[30] Foreign Application Priority Data

Apr. 17, 1978 [AU] Australia ............................. PD4060

[51] Int. Cl.³ ...................... E05B 67/36; E05B 69/00
[52] U.S. Cl. ........................................... 70/59; 70/19; 70/34
[58] Field of Search ................ 70/59, 39, 38 R, 38 A, 70/38 B, 38 C, 14, 57, 58, 19, 32-34; 2/6; 248/551

[56] References Cited

U.S. PATENT DOCUMENTS

| 2,983,133 | 5/1961 | Hruby | 70/39 |
| 3,008,318 | 11/1961 | Gutman | 70/38 A |
| 3,529,451 | 9/1970 | McOsker | 70/59 |
| 3,631,896 | 1/1972 | Meigs | 70/39 |

Primary Examiner—Robert L. Wolfe
Attorney, Agent, or Firm—Stevens, Davis, Miller & Mosher

[57] ABSTRACT

A device for locking a safety helmet to a vehicle such as a bicycle or motorcycle. A post extends from the motorcycle and has a pin-tumbler cylinder lock secured to it for receipt of the limbs of a clevis which extend through holes in the helmet so as to lock the helmet to the post when assembled together.

3 Claims, 6 Drawing Figures

HELMET LOCKING DEVICE

This invention relates to a device for locking an article to a construction, and more particularly to such a device for locking a safety helmet to a vehicle such as a bicycle or motorcycle.

In many countries riders of motorcycles are compelled by law to wear an officially approved type of safety helmet, and such helmets may cost from $45 to $80 according to make; thus these articles are costly enough to warrant their being looked after and guarded against damage or theft.

Many people commute between their homes and workplaces by motorcycle and at their destination have a choice of either leaving their helmets hanging, usually unsecured, on their machines or carrying them about with them—and although not heavy they are bulky and quite awkward to transport by hand. Helmets left unsecured are not infrequently stolen by the kind of thief who may be termed a hooligan or larrikin. That is to say, the thief may either steal the helmet for profit, or for personal use, or in some cases just kick it about for "fun". Then again, as is sometimes the case, the helmet may be placed over the end of a handlebar or over a rear-view mirror or other protruding integer of a machine with subsequent progressive damage, with continued practice, to the protective lining material which is usually expanded polystyrene and thus is easily crushable. With the device of the present invention this deleterious form of storage is rendered unnecessary.

It is therefore an object of the present invention to provide a thiefproof device for locking an article, for instance a safety helmet, to a construction such as a motorcycle. Commonwealth Patent Specification No. 450,644 describes and claims a "device for safe-keeping an article on a vehicle" and there is disclosed a handlebar 'setter' embodying a locking mechanism for holding a ring on the tie band of a helmet to the handlebar of the machine. This prior art device has two disadvantages of some magnitude; it it adapted specifically for incorporation with a handlebar clamp and thus lacks versatility, and it does not attach the shell of the helmet to the machine, but merely the strap of said helmet.

These and other disadvantages are overcome, in accordance with the present invention, which thus provides a device for locking an article to a construction, comprising a body portion securable to a suitable element of said construction; a clevis the limbs of which are extendable through co-operating apertures in said article and thence into said body portion; and locking means in said body to enable at least one limb of said clevis to be lockingly held in said body portion, thereby preventing unauthorized removal of said article from said construction.

Preferably, the body portion is comprised of a U-shaped member and a cavitied member, these two members being hinged together so as to define between them a cylindrical bore adapted to clamp about a said element of the construction, the U-shaped member having one limb elongated, which limb, when the body portion is clamped about the element, overlies the cavitied member and is securable to it; the locking means being located in the cavitied portion as will be described hereinafter.

This locking means may include a pin-tumbler cylinder lock, the blank end of whic is provided with a ninety-degree fastener (to be defined hereinafter); at least one limb of the clevis having a co-operating free end. In place of the ninety-degree fastener, the blank end of the lock may have a locking-bar, each end of which has a semicircular notch, in opposed disposition, the limbs of the clevis having co-operating, annularly-grooved free ends.

In this specification the article is generally described in terms of a motorcyclist's safety helmet and the construction in terms of a motorcycle but, as can be imagined, they need not be so limited; for example the article could well be a construction workers safety hat and the construction a scaffolding.

In order that a better understanding of the present invention may be gained by the reader, hereinafter are described certain embodiments thereof, by way of example only, and with reference to the accompanying drawings in which.

Figure 1:
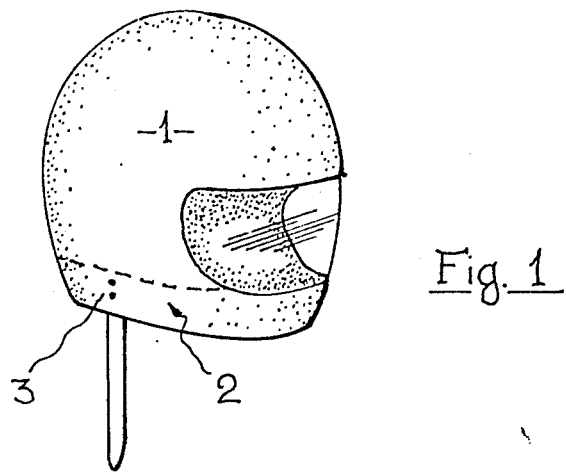
FIG. 1 shows a typical safety helmet slightly modified for use with the present invention.

FIG. 1 shows a typical safety helmet 1 of a kind meeting legal requirements; such a helmet may consist of a laminated glass-fibre reinforced resin shell, an expanded polystyrene lining layer and a resilient inner shell. The major protection zones of the helmet must not, by law, be altered or mutilated in any way but the zone referenced 2, outside these "test" areas, is non-critical, so it is in this zone 2 that the modification is made to enable the helmet to be locked to a motorcycle by the device. The modification consists in two small apertures 3 drilled through zone 2, to be more fully described later herein.

Figure 2:
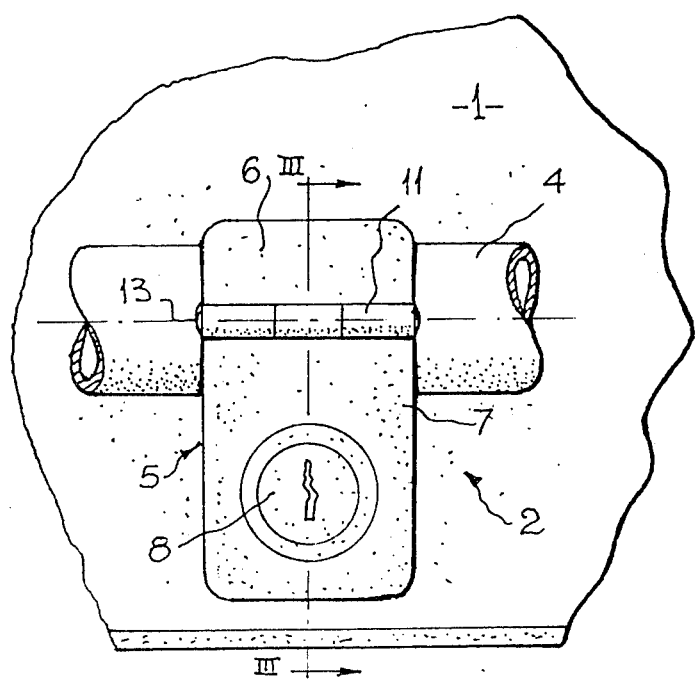
FIG. 2 is a front elevation of the device attached to an element of a construction.
Figure 3:
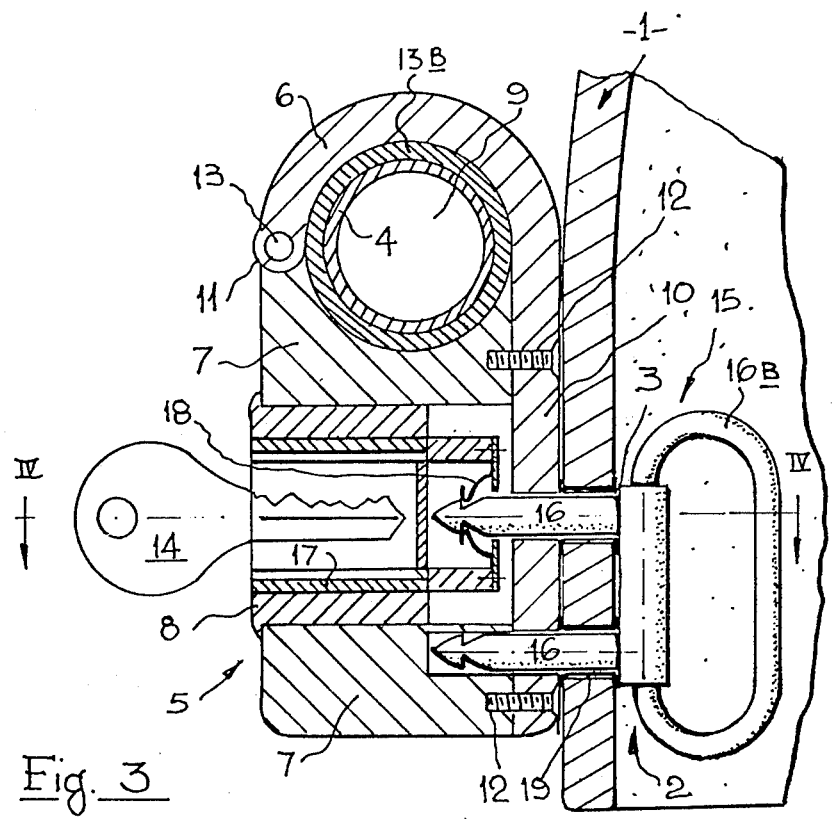
FIG. 3 is a vertical cross-section taken on line III—III of FIG. 2.
Figure 4:
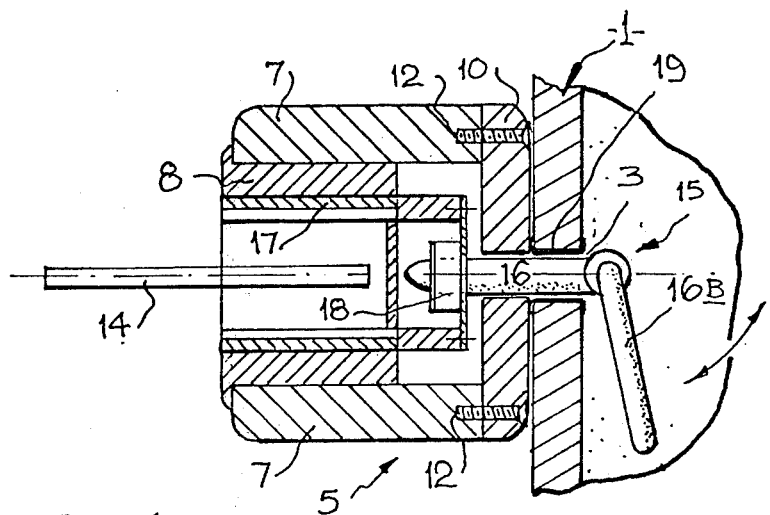
FIG. 4 is a horizontal cross-section along line IV—IV of FIG. 3.
Figure 6:
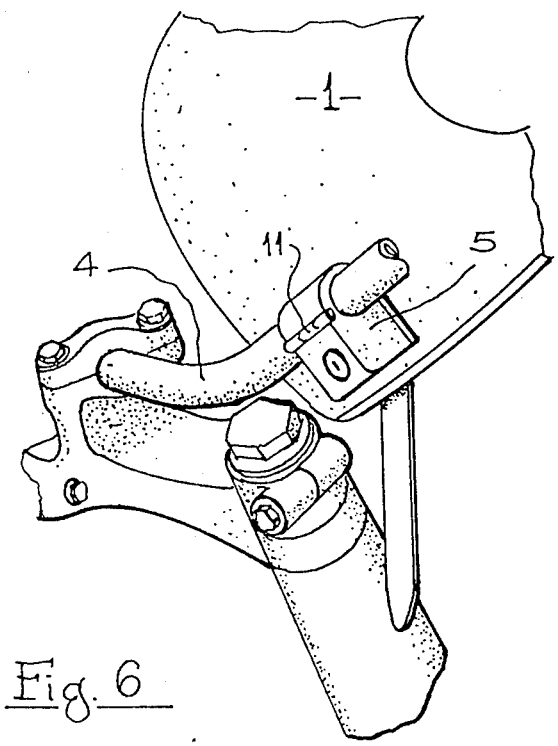
FIG. 6 is a fragmentary view of a safety helmet secured to the handlebar of a motorcycle by means of the device according to the present invention.

FIG. 2, taken in conjunction with FIGS. 3, 4 and 6, merely shows that the device is a rounded-topped, rectangular object having a bore through it, towards the top, adapted to fit around an element 4 such as handlebar, crash bar, frame tube or the like as is found to be most convenient for the user, the choice often being dictated by the make and model of the machine to which the device is to be fitted. The device is comprised of a body portion, generally referenced 5 which includes a hinged U-shaped member 6 and a cavitied member 7 containing a pin-tumbler cylinder lock 8.

FIG. 3 is a vertical cross-section on line III—III of FIG. 2. It will be seen that U-shaped member 6 and cavitied member 7 between them define a cylindrical bore 9 adapted to be clamped about a handlebar, crash bar or frame tube. U-shaped member 6 has one elongated limb 10 and is attached to cavitied member 7 by a hinge 11 (best seen in FIGS. 2 and 6). As will be seen, when members 6 and 7 are juxtaposed to clamp element 4, elongated limb 10 overlies cavitied member 7 and is secured thereto by such means as the screws 12. As an added security measure, the slots in the head of screws 12 may be destroyed or the screws rendered inoperable in some other way and the exposed ends of the hinge-pin 13 burred, splayed or knurled to prevent it from being knocked out endwise. It will now be clearly seen that, whether or not screws 12 are rendered tamperproof, unauthorised access to limb 10, when helmet 1 is locked to an element such as 4, is denied by the very close proximity of the shell of the helmet to body portion 5. Bore 9 may be provided with a bush or grommet 13B, say of neoprene, to give a firm and non-slip fit on element 4.

Suitable material, from which body portion 5 may be manufactured, include tensile hardened vanadium steel, stainless steel of Rockwell Hardness 40 Rc, castable metals with or without case-hardening to Rockwell Hardness 60 Rc, and impact-resistant plastics material (for instance, poly-carbonates), or a plastics material which is capable of being metallized.

Within cavitied member 7 there is a lock, ideally a pin-tumbler cylinder lock 8, of known kind, and in FIGS. 3 and 4 the spring-urged pin-tumblers are not shown in the interests of clarity; lock 8 is operated by conventional key 14.

Generally referenced 15 is an integer termed in this specification a "clevis" which it resembles, while not, of course, being a true clevis in its mode of operation. Be that as it may, "clevis" is a somewhat apt term for this integer and will be used throughout. Clevis 15 has a finger-ring 16B or the like which may swivel, pivot or hinge with respect to the limbs 16 of clevis 15. Limbs 16 are adapted to extend through the apertures 3 in the non-critical zone 2 of helmet 1 and thence into cavitied member 7 of body portion 5.

Attached in some suitable manner to the blank end of lock barrel 17 and rotating with it is what is known as a ninety-degree fastener; this has a pair of spring jaws 18 with recurved edges. The free ends of limbs 16, or at least one such free end, have 'gothic-arch'-contoured tips and a pair of opposed notches as is best to be seen on the lower limb of FIG. 3. In this regard it should be here stated that there is no real reason for body portion 5 to be disposed with bore 9 uppermost, so that 'lower limb' may become 'upper limb' if body portion 5 were to be used inverted with respect to the position shown in the Figures.

Limbs 16 of clevis 15 are inserted through the apertures in the helmet and registering apertures in elongated limb 10, and the free end of one of the limbs forces jaws 18 open to receive the end; jaws 18 then partially close and their recurved edges engage with the opposed notches at the end of limb 16 so as to prevent limb 16 from being withdrawn from jaws 18 until such a time as when key 14 is inserted in lock 8 and barrel 17 turned through 90°. The notches are then enabled to disengage from jaws 18, and the limb 16 can be withdrawn. These jaws 18 will disengage from the notches of limb 16 before serious damage can be done to the shell of the helmet. This is important, because, otherwise, serious damage could well be done to the helmet and go quite undetected by cursory examination. It thus will better to allow the helmet to be stolen by forcible disengagement in this way than to risk potentially lethal deterioration of the helmet which goes thus endetected except upon expert examination.

Apertures 3 in zone 2 of helmet 1 should be bushed with "hollow rivets" or grommets 19 to reinforce the edges of the apertures against damage and, to comply with the legal requirements, should not stand proud of the surface of the helmet by more than 5 mm.

Figure 5:
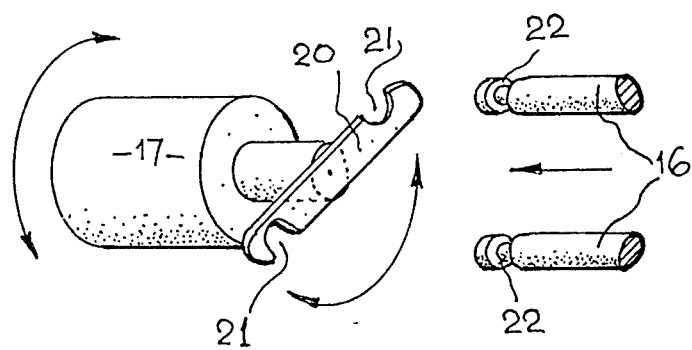
FIG. 5 shows an alternative embodiment of the locking means.

FIG. 5 illustrates a second embodiment of a locking means suitable for incorporation in cavitied member 7. In this modification lock barrel 17 has, instead of a ninety-degree fastener, a locking bar 20 at its blank end. Locking bar 20 rotates with barrel 17 and has notches 21 at each end. Each limb 16 of the clevis has, towards its free end, an annular groove 22 engageable with notches 21 so as to prevent limbs 16 from being withdrawn. Again, a ninety-degree rotation of barrel 17 will free grooves 22 from notches 21 to allow withdrawal of limbs 16. As will be readily understood, in this latter embodiment the longitudinal, i.e. rotational, axis of barrel 17 must be disposed equidistantly between limbs 16.

FIG. 6 is a fragmentary, pictorial view of a helmet 1 locked to an element 4—in this case the handlebar—of a motorcycle by means of the device according to the present invention. It will be seen that an additional advantage of this arrangement resides in the fact that the helmet may be locked to a machine in such a way that its crown is oriented upwardly and thus cannot collect rainwater.

From the above-going, the reader will appreciate that the invention offers a foolproof means for locking an article such as a safety helmet to such a construction as a motorcycle, and at the very least provides the public with a useful choice.

The claims defining the invention are as follows:

1. A device for locking a motorcycle safety helmet to a constructional element of a motorcycle comprising:
    a body portion securable to said constructional element;
    a locking member having a pair of projecting parallel pins, said pins being extendable through cooperating apertures in a wall of said motorcycle safety helmet and thence into said body portion;
    and a pin-tumbler cylinder lock in said body portion; said body portion being composed of a U-shaped member and a cavitied member, said U-shaped and cavitied members being hingedly connected together to define therebetween a cylindrical bore clampable about said constructional element, and said U-shaped member having one limb thereof elongated, which elongated limb overlies said cavitied portion and is securable thereto when said body portion is clamped about said constructional element; said pin-tumbler cylindrical lock being contained within said cavitied portion having a lock barrel portion of said cylinder lock including a pair of spring jaws attached thereto, and at least one projecting pin of said locking member having a cooperating free end including a pair of opposed notches engageable with said spring jaws; said spring jaws disengaging from said notches upon forcible disengagement of said helmet from said constructional element, thereby preventing serious damage to said helmet.

2. The device for locking a motorcycle safety helmet to a constructional element of a motorcycle as claimed in claim 1, wherein said elongated limb of said U-shaped member is closely overlaid by a portion of said safety helmet in such a manner that securing means securing said elongated limb to said cavitied member are rendered inaccessible except subsequent to authorized removal of said helmet from said constructional element.

3. A device for locking a motorcycle safety helmet to a constructional element of a motorcycle comprising:
    a body portion securable to said constructional element;
    a locking member having a pair of projecting parallel pins, said pins being extendable through cooperating apertures in a wall of said motorcycle safety helmet and thence into said body portion;

and a pin-tumbler cylinder lock in said body portion; said body portion being composed of a U-shaped member and a cavitied member, said U-shaped and cavitied members being hingedly connected together to define therebetween a cylindrical bore clampable about said constructional member, and said U-shaped member having one limb thereof elongated, which elongated limb overlies said cavitied portion and is securable thereto when said body portion is clamped about said constructional element and which elongated limb is closely overlaid by a portion of said safety helmet in such a manner that securing means securing said elogated limb to said cavitied member are rendered inaccessible except subsequent to authorized removal of said helmet from said constructional element, said pin-tumbler cylinder lock being contained within said cavitied portion, a lock barrel portion of said cylinder lock including a locking-bar having a semicircular notch at each end thereof in opposed disposition, the projecting pins of said locking member having cooperating, annularly-grooved free ends; said locking-bar disengaging from said grooves upon forcible disengagement of said helmet from said constructional element, thereby preventing damage from being inflicted upon said helmet.

* * * * *